United States Patent

Goodell et al.

[11] Patent Number: 5,286,282
[45] Date of Patent: Feb. 15, 1994

[54] CONTINUOUS FLOW AIR DRYER WITH DOUBLE HELIX SPLIT DESICCANT BED

[75] Inventors: David J. Goodell, Lorain; James P. Koenig, Olmsted Twp., Lorain County, both of Ohio

[73] Assignee: Allied-Signal Inc., Morristown, N.J.

[21] Appl. No.: 57,598

[22] Filed: May 4, 1993

[51] Int. Cl.⁵ .................................. B01D 53/04
[52] U.S. Cl. ........................... 96/113; 96/144; 96/147; 96/152
[58] Field of Search ............... 55/399, 420; 95/21, 95/22, 121; 96/113, 114, 115, 144, 147, 152

[56] References Cited

U.S. PATENT DOCUMENTS

| | | | |
|---|---|---|---|
| 3,472,000 | 10/1969 | Glass et al. | 96/113 |
| 3,890,122 | 6/1975 | Frantz | |
| 4,237,620 | 12/1980 | Black | |
| 4,487,617 | 12/1984 | Dienes et al. | |
| 4,544,385 | 10/1985 | Tanaka | |
| 4,574,844 | 3/1986 | Neff et al. | |
| 4,581,047 | 4/1986 | Larson | |
| 4,653,419 | 6/1987 | Kojima | |
| 4,764,189 | 8/1988 | Yamagawa et al. | 96/114 |
| 4,892,569 | 1/1990 | Kijima | |
| 4,946,485 | 8/1990 | Larson | |
| 4,955,994 | 9/1990 | Knight et al. | 96/113 |
| 5,002,596 | 3/1991 | Maskaitis et al. | 96/152 |
| 5,110,327 | 5/1992 | Smith | 96/113 |

Primary Examiner—Charles Hart
Attorney, Agent, or Firm—Ken C. Decker; William N. Antonis

[57] ABSTRACT

An air dryer for compressed air braking systems includes a desiccant canister which is provided with a double helix insert which cooperates with the walls of the canister to define a pair of intertwined, serpentine, pneumatically isolated flow paths. The flow paths extend through the canister between the end walls and are filled with a desiccant material. A single center line valve mechanism is provided to switch between the flow paths so that one of the flow paths is purged at the same time that the other flow path is pressurized.

18 Claims, 3 Drawing Sheets

CONTINUOUS FLOW AIR DRYER WITH DOUBLE HELIX SPLIT DESICCANT BED

This invention relates to an air dryer for a compressed air braking system.

Air dryers have been used for many years to remove moisture from the compressed air used in compressed air braking systems used on heavy vehicles. These air dryers are of two basic types. The continuous flow type usually includes two separate desiccant beds and a timing mechanism to switch flow between the beds. When one of the beds is drying air, the other desiccant bed is being purged and regenerated. Continuous flow systems are normally used in application with heavy air consumption, such as transit buses. On applications with lower air consumption requirements, such as line haul trucks, a single bed desiccant cartridge is used. A single bed requires a dedicated purge volume, which may be incorporated into the air dryer unit itself, or mounted remotely. The present invention provides a twin-bed continuous flow air dryer of the same or smaller size of prior art single bed air dryers. The drying capacity of a desiccant bed is a function of the length to diameter (L/D) ratio of the bed, a higher L/D ratio being more efficient than a lower L/D ratio desiccant bed. Accordingly, the present invention provides a double helix insert in the desiccant canister, thereby dividing the canister into pneumatically isolated, serpentine, intertwined desiccant beds. Each of the desiccant beds has a relatively high length to diameter ratio as compared to prior art air dryers.

This and other advantages of the present invention will become apparent from the following description, with reference to the accompanying drawings, in which.

Figure 1:
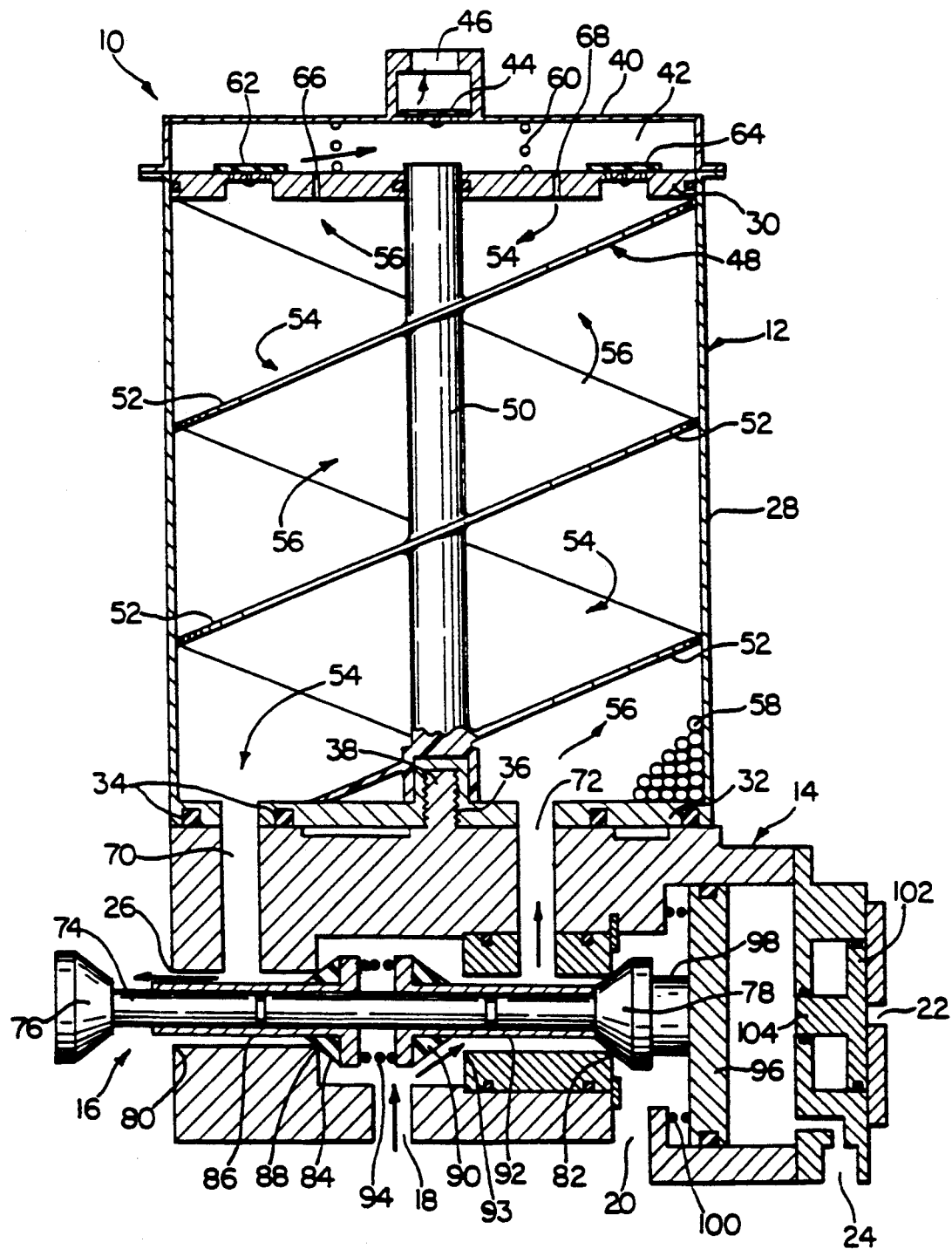
FIG. 1 is a cross-sectional view of a continuous flow air dryer made pursuant to the teachings of the present invention.

Referring now to the drawings, an air dryer generally indicated by the numeral 10 includes a desiccant canister 12 mounted on a housing 14 containing a shuttle valve generally indicated by the numeral 16. The housing 14 includes a supply port 18, which is communicated to a source of compressed air, such as the vehicle air compressor; a pair of purge ports 20 and 26, which are communicated to ambient atmosphere; an unloading port 22, which receives a pressure signal communicated by the vehicle compressor unloader; and a control port 24, which is communicated to a timed control signal, that is, a signal controlled by a timed solenoid valve which communicates a pressure signal to the control port 24 for a predetermined time period and then exhausts the signal from port 24 to atmosphere for an equivalent time period.

The desiccant canister 12 includes a circumferentially extending wall 28 bounded by upper and lower end walls 30, 32. End wall 32 is provided with circumferentially extending seals 34 which sealing engage the housing 14, and is also provided with a threaded connection 36 which engages threaded stud 38 when the canister 12 is installed on the housing 14. A cover member 40 cooperates with the end wall 30 to define a delivery chamber 42 therewithin. A delivery check valve 44 permits communication from the delivery chamber 42 to a delivery port 46, but prevents communication in the reverse direction. Delivery port 46 is communicated to appropriate storage reservoirs (not shown).

A double helix insert generally indicated by the numeral 48 is installed within the canister 12. The insert 48 includes a central stem 50 and a radially extending, axially inclined, continuous fin 52 projecting from the stem 50. The outer periphery of the fin 52 engages the circumferentially extending wall 28 of the desiccant canister 12. Opposite sides of the fin 52 cooperate to define a first flow path 54 and a second flow path 56. Because the flow paths 54, 56 are defined by opposite sides of the fin 52, the flow paths 54, 56 are intertwined in that the flow path 54 wraps around the flow path 56 and the flow path 56 wraps around the flow path 54, as illustrated in the drawings. Because both of the flow paths 54, 56 revolve around the central stem 50, each of the flow paths 54 and 56 define a serpentine path extending between the bottom and top of the desiccant canister 12. Both of the flow paths 54 and 56 are filled with desiccant beads, a few of which are indicated as at 58. The fin 52 maintains pneumatic isolation between the flow paths 54 and 56.

The upper end plate 30 is loaded downwardly by a spring 60 in the delivery chamber 42 to maintain pressures on the desiccant beads 58. A one-way check valve 62 permits communication from the flow path 56 into the delivery chamber 42, but prevents communication in reverse direction. Similarly, another one-way check valve 64 permits communication between the flow path 54 in the delivery chamber 42, but prevents communication in the reverse direction. A flow restricting orifice 66 permits communication, at a limited rate, from the delivery chamber 42 into the flow path 56 when the pressure in the flow path 56 drops below that in the delivery chamber 42, and another flow restricting orifice 68 similarly permits limited communication from the delivery chamber 42 into the flow path 54 when the pressure in flow path 54 drops below that in delivery chamber 42.

The housing 14 includes a passage 70 which communicates with the flow path 54 and another passage 72 which communicates with the flow path 56. The shuttle valve 16 controls communication between the supply port 18 and the passages 70 and 72, between the passage 70 and the purge port 26, and between the passage 72 and the purge port 20. Accordingly, shuttle valve 16 includes a stem 74 having enlarged valve elements 76, 78 mounted on opposite ends thereof. Valve element 76 cooperates with a valve seat 80 circumscribing purge port 26 to control communication through purge port 26 and the valve element 78 cooperates with valve seat 82 to control communication through the purge port 20. An inlet valve member 84 is mounted on a sleeve 86 which is slidably mounted on the stem 74. Valve member 84 cooperates with circumferentially extending valve seat 88 to control communication between inlet or supply port 18 and the passage 70. Similarly, another inlet valve member 90 is integral with a sleeve 92 which is also slidably mounted on the stem 74. Valve member 90 cooperates with valve seat 93 to control communication between the supply inlet port 18 and the passage 72. A spring 94 yieldably urges the valve members 84, 90 apart, so that the ends of the sleeves 86, 92 are yieldably urged towards the corresponding valve member 76 or 78.

A piston 96 includes an extension 98 that is secured to the valve member 78 so that the piston 96 is able to position the shuttle valve 16 within the housing 14. A spring 100 yieldably urges the piston 96, and therefore the shuttle valve 16, to the right, viewing the Figures. The piston 96 is controlled by the pressure signals communicated through control port 24. An unloader piston 102 is responsive to the pressure level at unloader port 22 and includes an extension 104 which engages the piston 96 when the unloader port 22 is pressurized and the pressure at control port 24 is vented, as illustrated in FIG. 3.

In operation, the position of the shuttle valve as illustrated in FIG. 1 is the position it assumes when the compressor is on load (and thus the unloader port 22 is vented) and the control port 24 is pressurized. Accordingly, piston 96 is urged to the left, viewing FIG. 1, thereby causing valve member 78 to close off communication between the purge port 20 and passage 72 and causing the valve member 76 to open purge port 26 to thereby vent passage 70 and flow path 54 to atmosphere. At the same time, valve element 90 is moved away from valve seat 93, permitting communication between the supply port 18 and the passage 72 and therefore to the flow path 56. Accordingly, compressed air communicates through the flow path 56, and out of the check valve 62 into the delivery chamber 42. Flow is communicated out of deliver chamber 42 and into the aforementioned reservoir (not shown) through the check valve 44. At the same time, the flow path 54 is communicated to atmosphere and thus is depressurized. Accordingly, since the pressure level and flow path 54 is now less than the pressure in delivery chamber 42, limited communication through the flow restricting orifice 68 purges the desiccant in the flow path 54.

Figure 2:
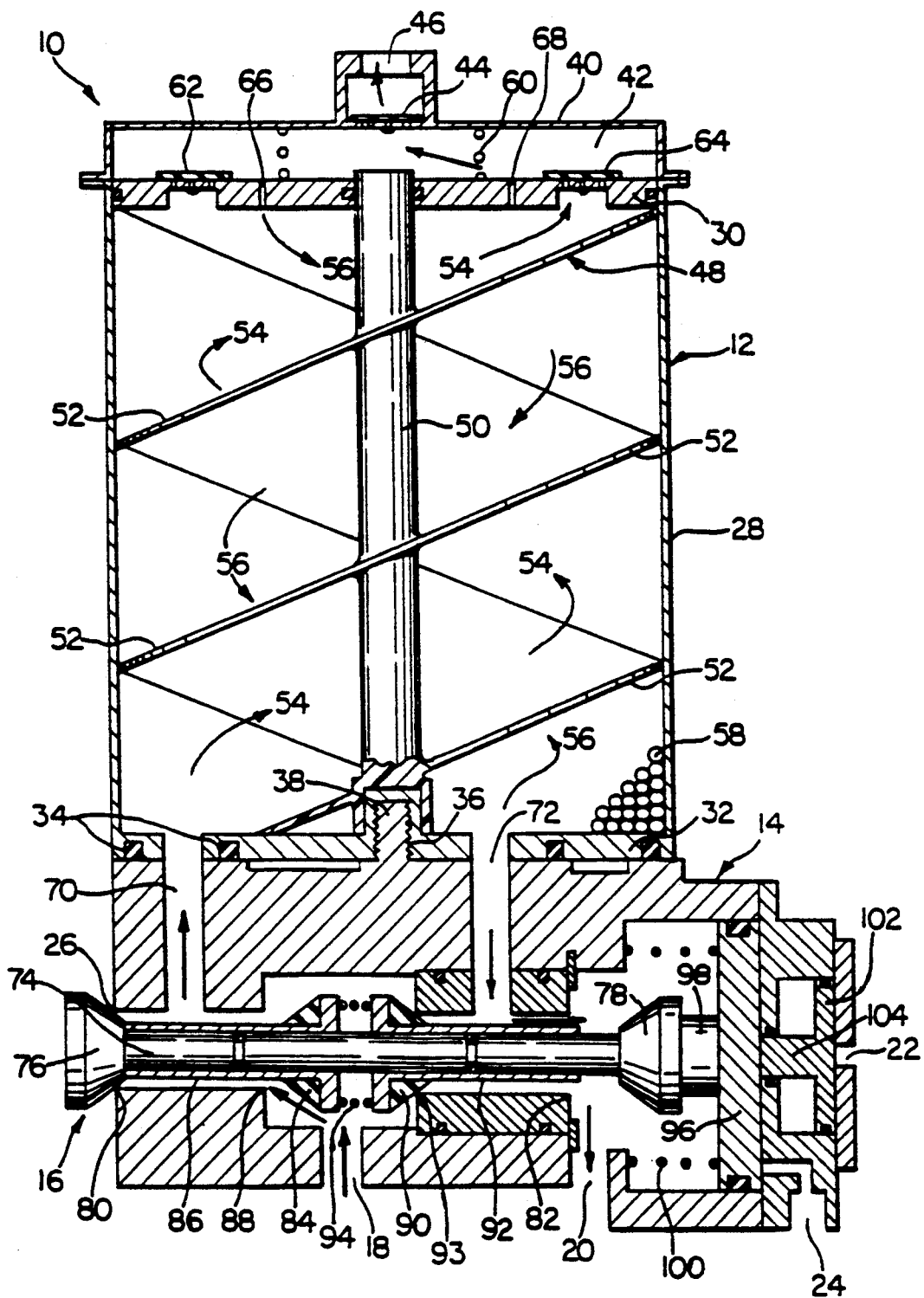
FIG. 2 is a view similar to FIG. 1 but showing the shuttle valve which controls flow between the beds in a position different from the position of the shuttle valve in FIG. 1.

As discussed above, after a predetermined time period, control port 24 is vented. Accordingly, spring 100 acting against piston 96 moves the piston 96, and therefore the shuttle valve 16, to the right, viewing the Figures, into the position illustrated in FIG. 2. In this position, the purge port 26 is closed and communication is established between supply port 18 and passage 70, and therefor into the flow path 54, thereby pressurizing flow path 54 to deliver compressed air into the deliver chamber 42. At the same time, valve member 90 is engaged with valve seat 36, thereby cutting off communication between supply or inlet port 18 and the passage 72. The valve member 78 is also moved over away from the valve seat 82, thereby communicating passage 72, and therefore the flow path 56, to atmosphere through the purge port 20. Accordingly, flow path 56 is depresurized, permitting limited communication through the flow restricting orifice 66 between the delivery chamber 42 and the desiccant within the flow path 56 to thereby purge the desiccant 58 therein, in a matter well known to those skilled in the art. It will be understood that, after the aforementioned predetermined time period (assuming the compressor remains on load) the pressure at the control port 24 will again be switched, thereby moving the shuttle valve 16 back into the FIG. 1 position. Accordingly, the shuttle valve 16 is moved between the position illustrated in FIGS. 1 and 2 on a periodic timed basis as long as the compressor remains on load.

Figure 3:
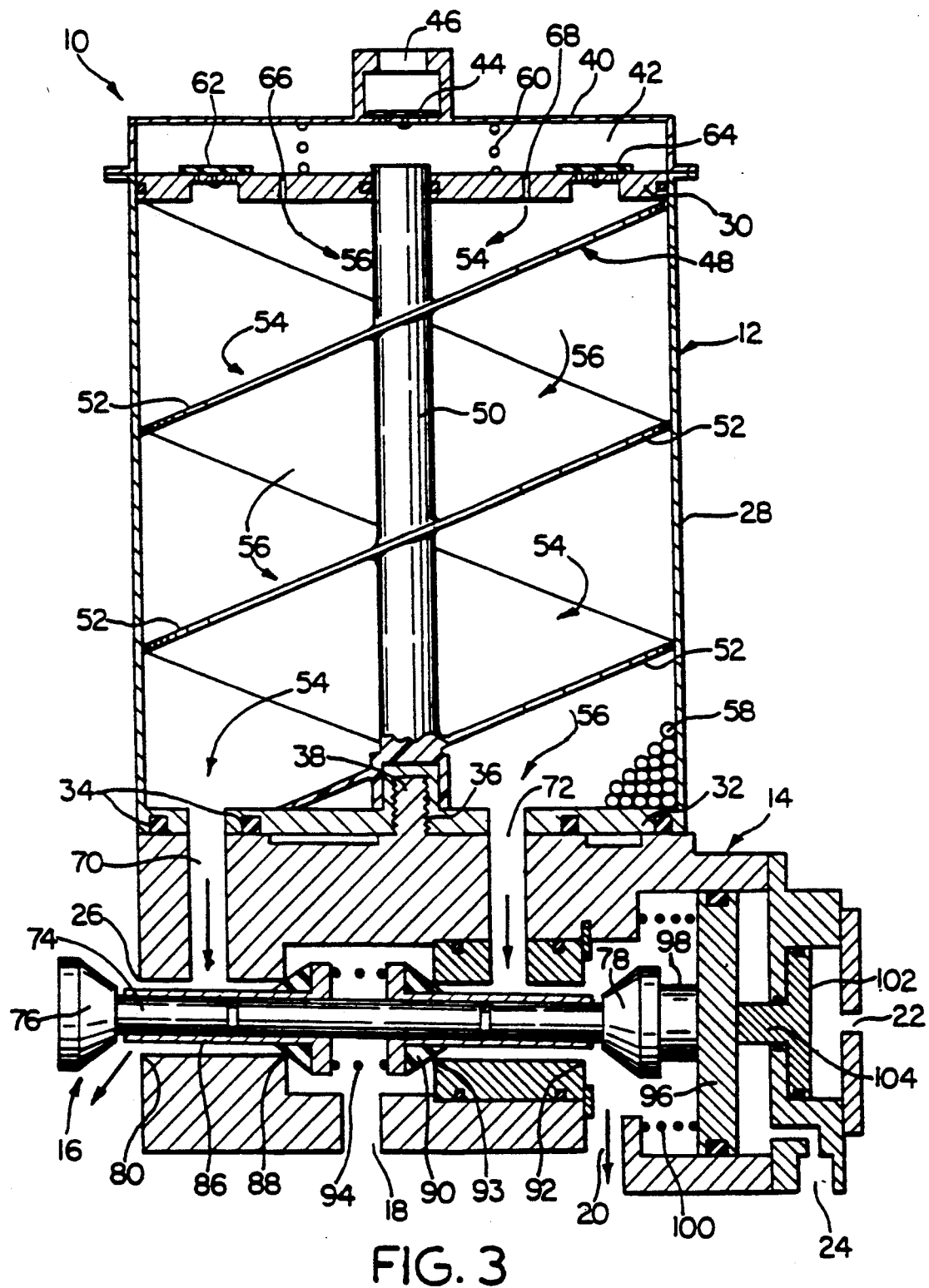
FIG. 3 is a view similar to FIGS. 1 and 2 but illustrating the shuttle valve in a third position different from the positions in which the shuttle valve is illustrated in FIGS. 1 and 2.

FIG. 3 illustrates the position of the components when the compressor goes off load. In this condition, no pressure is available to the supply inlet port 18, and the control port 24 is automatically vented, permitting the spring 100 to urge the piston 96 to the right, viewing the Figures. However, at this time, a pressure signal is communicated by the unloader mechanism through the unloader port 22 simultaneously with unloading of the compressor, thereby moving the unloader piston 102 to the left, viewing the Figures. Accordingly, as illustrated in FIG. 3, the shuttle valve 16 is positioned in an intermediate position between the FIG. 1 and FIG. 2 positions. In this case, communication between the inlet or supply port 18 and both of the passages 70, 72 is cut off due to the engagement of the valve members 84, 90 with their corresponding valve seats 88, 93. At the same time, the passage 70 is communicated to purge port 26 and the passage 72 is communicated to purge port 20, thereby simultaneously depressurizing both of the flow paths 54, 56. Accordingly, both of the fluid paths 54 and 56 are simultaneously purged by fluid pressure in the delivery chamber 42 communicating through flow restricting orifice 66, 68 until the pressure in the delivery chamber 42 reaches atmospheric pressure.

We claim:

1. Air dryer for a compressed air system comprising a housing, a desiccant canister carried by the housing, said canister being defined by a circumferentially extending wall and a pair of opposite end walls, a double helix insert within said canister and cooperating with said walls to define a pair of intertwined, serpentine, pneumatically isolated flow paths through said canister and extending between said end walls, each of said flow paths being filled with desiccant, and valve means carried by said housing for controlling communication through said flow paths.

2. Air dryer as claimed in claim 1, wherein both of said flow paths communicate with a common delivery chamber, and a pair of check valves, each of said check valves controlling communication between a corresponding one of said flow paths and said delivery chamber.

3. Air dryer as claimed in claim 1, wherein said housing includes a supply port for supplying compressed air to said canister, said valve means including a shuttle valve for switching communication from said supply port to one of said flow paths and then to the other flow path.

4. Air dryer as claimed in claim 2, wherein said housing includes a supply port for supplying compressed air to said canister and purge port means for communicating said flow paths to atmosphere, said valve means including a shuttle valve for communicating said supply port to one of said flow paths while communicating the other flow path to said purge port means and then switching to communicate the other flow path to the supply port and the one flow path to the purge port means.

5. Air dryer as claimed in claim 4, wherein a flow restricting purge orifice communicates each of said flow paths with said common delivery chamber.

6. Air dryer as claimed in claim 2, wherein a flow restricting purge orifice communicates each of said flow paths with said common delivery chamber.

7. Air dryer as claimed in claim 4, wherein said housing includes an unloader port, said shuttle valve means including means responsive to the pressure level at the unloader port to shift the shuttle valve means to a position communicating both of said flow paths to said purge port means.

8. Air dryer for a compressed air system comprising a housing, a desiccant canister carried by the housing, said canister being defined by a circumferentially extending wall defining a chamber therewithin and a pair of opposite end walls closing opposite ends of the chamber, dividing means for dividing said chamber into a pair of pneumatically isolated flow paths, each of said flow paths extending between each of the opposite end walls, each of said flow paths being filled with desiccant, and valve means carried by said housing for controlling communication through said flow paths, both of said flow paths communicating with a common delivery chamber, and a pair of check valves, each of said check valves controlling communication between a corresponding one of said flow paths and said delivery chamber.

9. Air dryer as claimed in claim 8, wherein said dividing means divides said chamber into a pair of serpentine flow paths.

10. Air dryer as claimed in claim 9, wherein said flow paths are intertwined.

11. Air dryer as claimed in claim 8, wherein said housing includes a supply port for supplying compressed air to said canister, said valve means including a shuttle valve for switching communication from said supply port to one of said flow paths and then to the other flow path.

12. Air dryer as claimed in claim 8, wherein said housing includes a supply port for supplying compressed air to said canister and purge port means for communicating said flow paths to atmosphere, said valve means including a shuttle valve for communicating said supply port to one of said flow paths while communicating the other flow path to said purge port means and then switching to communicate the other flow path to the supply port and the one flow path to the purge port means.

13. Air dryer as claimed in claim 12, wherein a flow restricting purge orifice communicates each of said flow paths with said common delivery chamber.

14. Air dryer as claimed in claim 8, wherein a flow restricting purge orifice communicates each of said flow paths with said common delivery chamber.

15. Air dryer as claimed in claim 12, wherein said housing includes an unloader port, said shuttle valve means including means responsive to the pressure level at the unloader port to shift the shuttle valve means to a position communicating both of said flow paths to said purge port means.

16. Air dryer for a compressed air system comprising a housing, a desiccant canister carried by the housing, said canister being defined by a circumferentially extending wall defining a chamber therewithin and a pair of opposite end walls closing opposite ends of the chamber, dividing means for dividing said chamber into a pair of pneumatically isolated flow paths, each of said flow paths extending between each of the opposite end walls, each of said flow paths being filled with desiccant, and valve means carried by said housing for controlling communication through said flow paths, said housing including a supply port for supplying compressed air to said canister and purge port means for communicating said flow paths to atmosphere, said valve means including a shuttle valve for communicating said supply port to one of said flow paths while communicating the other flow path to said purge port means and then switching to communicate the other flow path to the supply port and the one flow path to the purge port means.

17. Air dryer as claimed in claim 16, wherein said dividing means divides said chamber into a pair of serpentine flow paths.

18. Air dryer as claimed in claim 16, wherein said flow paths are intertwined.

* * * * *